(12) United States Patent
Tatsuta

(10) Patent No.: US 9,992,059 B2
(45) Date of Patent: Jun. 5, 2018

(54) NETWORK OPERATION MANAGEMENT SYSTEM, NETWORK OPERATION MANAGEMENT APPARATUS, AND NETWORK OPERATION MANAGEMENT METHOD

(71) Applicant: Panasonic Intellectual Property Management Co., Ltd., Osaka (JP)

(72) Inventor: Akihiro Tatsuta, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 15/081,059

(22) Filed: Mar. 25, 2016

(65) Prior Publication Data

US 2016/0285680 A1 Sep. 29, 2016

(30) Foreign Application Priority Data

Mar. 27, 2015 (JP) .................................. 2015-065871
Mar. 16, 2016 (JP) .................................. 2016-051762

(51) Int. Cl.
*H04W 24/00* (2009.01)
*H04L 12/24* (2006.01)
(Continued)

(52) U.S. Cl.
CPC ......... *H04L 41/0686* (2013.01); *H04N 7/181* (2013.01); *H04N 17/00* (2013.01);
(Continued)

(58) Field of Classification Search
CPC . H04L 41/0686; H04L 41/22; H04L 43/0888; H04L 43/0847; H04N 7/181; H04N 17/00; H04W 84/12; H04W 24/08
(Continued)

(56) References Cited

U.S. PATENT DOCUMENTS

2005/0048965 A1 3/2005 Ebata
2006/0009254 A1* 1/2006 Kanazawa .......... H04M 1/6041
455/553.1

(Continued)

FOREIGN PATENT DOCUMENTS

JP 2007-329627 12/2007
JP 4215600 1/2009
JP 2011-139120 7/2011

*Primary Examiner* — Marcos Batista
(74) *Attorney, Agent, or Firm* — Wenderoth, Lind & Ponack, L.L.P.

(57) ABSTRACT

A network operation management system includes: an imaging unit configured to capture a video image in a predetermined sight of the area; a wireless management unit configured to obtain operational information of the wireless terminal, and to manage the obtained operational information in association with an obtained date; and a video image management unit configured to receive a video image and a captured date captured by the imaging unit, and to manage the video image in association with the captured date. The video image management unit obtains the operational information and the obtained date from the wireless management unit, manages the video image associated with a captured date which matches with the obtained date, in association with the operational information, and extracts the video image and the operational information associated with a predetermined date.

9 Claims, 20 Drawing Sheets

(51) Int. Cl.
*H04N 17/00* (2006.01)
*H04N 7/18* (2006.01)
*H04W 24/08* (2009.01)
*H04W 84/12* (2009.01)
*H04L 12/26* (2006.01)

(52) U.S. Cl.
CPC .......... *H04L 41/22* (2013.01); *H04L 43/0847* (2013.01); *H04L 43/0888* (2013.01); *H04W 24/08* (2013.01); *H04W 84/12* (2013.01)

(58) Field of Classification Search
USPC .......................................... 455/423; 370/338
See application file for complete search history.

(56) References Cited

U.S. PATENT DOCUMENTS

2012/0249798 A1   10/2012  Kim
2016/0173337 A1*  6/2016  Lea ..................... H04L 43/0811
                                                      370/254

* cited by examiner

FIG. 3

| Date | AP_ID | Terminal ID | RSSI |
|---|---|---|---|
| 2015/03/20  T1 | AP_1 | 170a | R11 |
| 2015/03/20  T1+ΔT | AP_1 | 170b | R21 |
| 2015/03/20  T1+2ΔT | AP_2 | 170c | R31 |
| 2015/03/20  T1+3ΔT | AP_2 | 170d | R41 |
| 2015/03/20  T2 | AP_1 | 170a | R12 |
| 2015/03/20  T2+ΔT | AP_1 | 170b | R22 |
| 2015/03/20  T2+2ΔT | AP_2 | 170c | R32 |
| 2015/03/20  T2+3ΔT | AP_2 | 170d | R42 |
| 2015/03/20  T3 | AP_1 | 170a | R13 |
| 2015/03/20  T3+ΔT | AP_1 | 170b | R23 |
| 2015/03/20  T3+2ΔT | AP_2 | 170c | R33 |
| 2015/03/20  T3+3ΔT | AP_2 | 170d | R43 |
| ... | ... | ... | ... |

FIG. 5

| Date | Video image file |
|---|---|
| 2015/03/20  T1 | Video1-1 |
| 2015/03/20  T1+ΔT | Video2-1 |
| 2015/03/20  T1+2ΔT | Video3-1 |
| 2015/03/20  T1+3ΔT | Video4-1 |
| 2015/03/20  T2 | Video1-2 |
| 2015/03/20  T2+ΔT | Video2-2 |
| 2015/03/20  T2+2ΔT | Video3-2 |
| 2015/03/20  T2+3ΔT | Video4-2 |
| 2015/03/20  T3 | Video1-3 |
| 2015/03/20  T3+ΔT | Video2-3 |
| 2015/03/20  T3+2ΔT | Video3-3 |
| 2015/03/20  T3+3ΔT | Video4-3 |
| ... | ... |

FIG. 6

| Date | Video image file | AP ID | Terminal ID | RSSI |
|---|---|---|---|---|
| 2015/03/20  T2 | Video1-2 | AP_1 | 170a | R12 |
| ... | ... | ... | ... | ... |

FIG. 16

| Date | AP ID | Terminal ID | RSSI | PER |
|---|---|---|---|---|
| T1 | AP_1 | 270a | R11 | P11 |
| T2 | AP_1 | 270a | R12 | P12 |
| T3 | AP_1 | 270a | R13 | P13 |
| ... | ... | ... | ... | ... |

FIG. 17

| Date | Video image file | AP ID | Terminal ID | RSSI | PER |
|---|---|---|---|---|---|
| 2015/03/20 T2 | Video1-2 | AP1 | 170a | R12 | P12 |

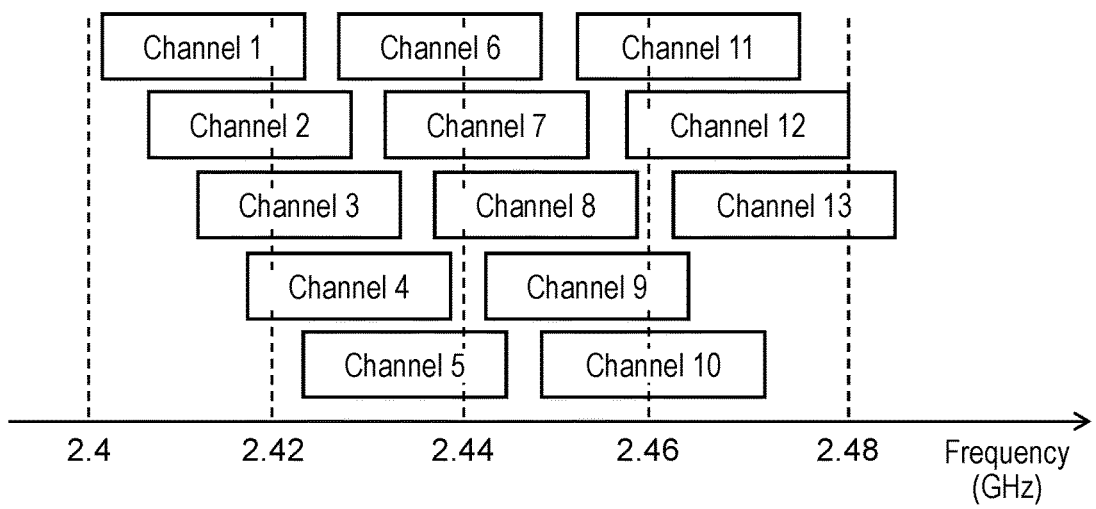

FIG. 25

| Date | AP ID | Terminal ID | RSSI | PER |
|---|---|---|---|---|
| 2015/03/20  T2 | AP_1 | 170a | R12 | P12 |

NETWORK OPERATION MANAGEMENT SYSTEM, NETWORK OPERATION MANAGEMENT APPARATUS, AND NETWORK OPERATION MANAGEMENT METHOD

BACKGROUND

1. Field of the Invention

The present disclosure relates to a network operation management system, a network operation management apparatus, and a network operation management method, which manage an operational status of a wireless terminal in a wireless Local Area Network (LAN) system.

2. Description of the Related Art

Japanese Patent No. 4,215,600 discloses a wireless LAN system capable of visually displaying an operational state based on a load condition, an interference condition and a usage situation of a wireless channel, for each cell of a wireless LAN, along with an influenced range of the operational status, on an area chart. In Japanese Patent No. 4,215,600, in the wireless LAN system operating a plurality of wireless LAN access points (APs), the wireless LAN system grasps an operational status based on a range of a cell which is a cover range of each of the APs and operational information of a terminal in the cell. Then, a display that coincides with the operational status is made in each cell range on the area chart, and thereby, an administrator can easily grasp an operational status for each location. Further, the administrator can determine quality of communication for each position, to thereby easily seek a cause of performance deterioration.

SUMMARY

The present disclosure provides a network operation management system, a network operation management apparatus, and a network operation management method, which can easily narrow down a failure factor with respect to a connection failure of a wireless terminal in a wireless LAN system. A network operation management system in the present disclosure is a network operation management system managing an operational status of a wireless LAN system including a wireless terminal and at least one base station installed in an arbitrary area. The system includes: at least one imaging unit configured to be installed in the area and to capture a video image in a predetermined sight of the area; a wireless management unit configured to connect to the base station with a network, to obtain operational information of the wireless terminal, and to manage the obtained operational information in association with an obtained date; a video image management unit configured to connect to the imaging unit with the network, to receive a video image and a captured date captured by the imaging unit, and to manage the video image in association with the captured date; and a display configured to display the video image managed by the video image management unit. The video image management unit obtains the operational information and the obtained date from the wireless management unit, manages the video image associated with a captured date which matches with the obtained date in association with the operational information, and extracts the video image and the operational information associated with a predetermined date, and the display displays the video image and the operational information.

A network operation management apparatus in the present disclosure is a network operation management apparatus managing an operational status of a wireless LAN system including a wireless terminal and at least one base station installed in an arbitrary area. The apparatus includes: a wireless management unit configured to connect to the base station with a network, to obtain operational information of the wireless terminal, and to manage the obtained operational information in association with an obtained date; a video image management unit configured to receive a video image and a captured date captured by at least one imaging apparatus, and to manage the video image in association with the captured date, which is installed in the area and captures a video image in a predetermined sight of the area; and a display configured to display the video image managed by the video image management unit. The video image management unit obtains the operational information and the obtained date from the wireless management unit, manages the video image, associated with a captured date which matches with the obtained date, in association with the operational information, and extracts the video image and the operational information associated with a predetermined date, and the display displays the video image and the operational information.

A network operation management method in the present disclosure is a network operation management method for managing an operational status of a wireless LAN system including a wireless terminal and at least one base station installed in an arbitrary area. The method includes: obtaining operational information of the wireless terminal from the base station through a network; managing the obtained operational information in association with an obtained date; receiving a video image and a captured date captured by at least one imaging apparatus, which is installed in the area and captures a video image in a predetermined sight of the area; managing the video image in association with the captured date; managing the video image, associated with the captured date which matches with the obtained date, in association with the operational information; extracting the video image and the operational information associated with a predetermined date; and displaying the video image and the operational information.

The network operation management system, the network operation management apparatus, and the network operation management method in the present disclosure can easily narrow down a failure factor with respect to a connection failure of the wireless terminal in the wireless LAN system.

BRIEF DESCRIPTION OF DRAWINGS

FIG. 3 is a diagram showing an example of an operational information management table according to the first exemplary embodiment;

FIG. 5 is a diagram showing an example of a video image management table according to the first exemplary embodiment;

FIG. 6 is a diagram showing an example of a failure information management table according to the first exemplary embodiment;

FIG. 16 is a diagram showing an example of an operational information management table according to the second exemplary embodiment;

FIG. 17 is a diagram showing an example of a failure information management table according to the second exemplary embodiment;

FIG. 19 is a diagram describing allocation of frequency channels which can be used in a wireless LAN in a 2.4 GHz band;

FIG. 20 is a diagram describing combination of frequency channels and APs according to the second exemplary embodiment;

FIG. 25 is a diagram showing an example of failure information according to the second exemplary embodiment.

DETAILED DESCRIPTION

Figure 1:
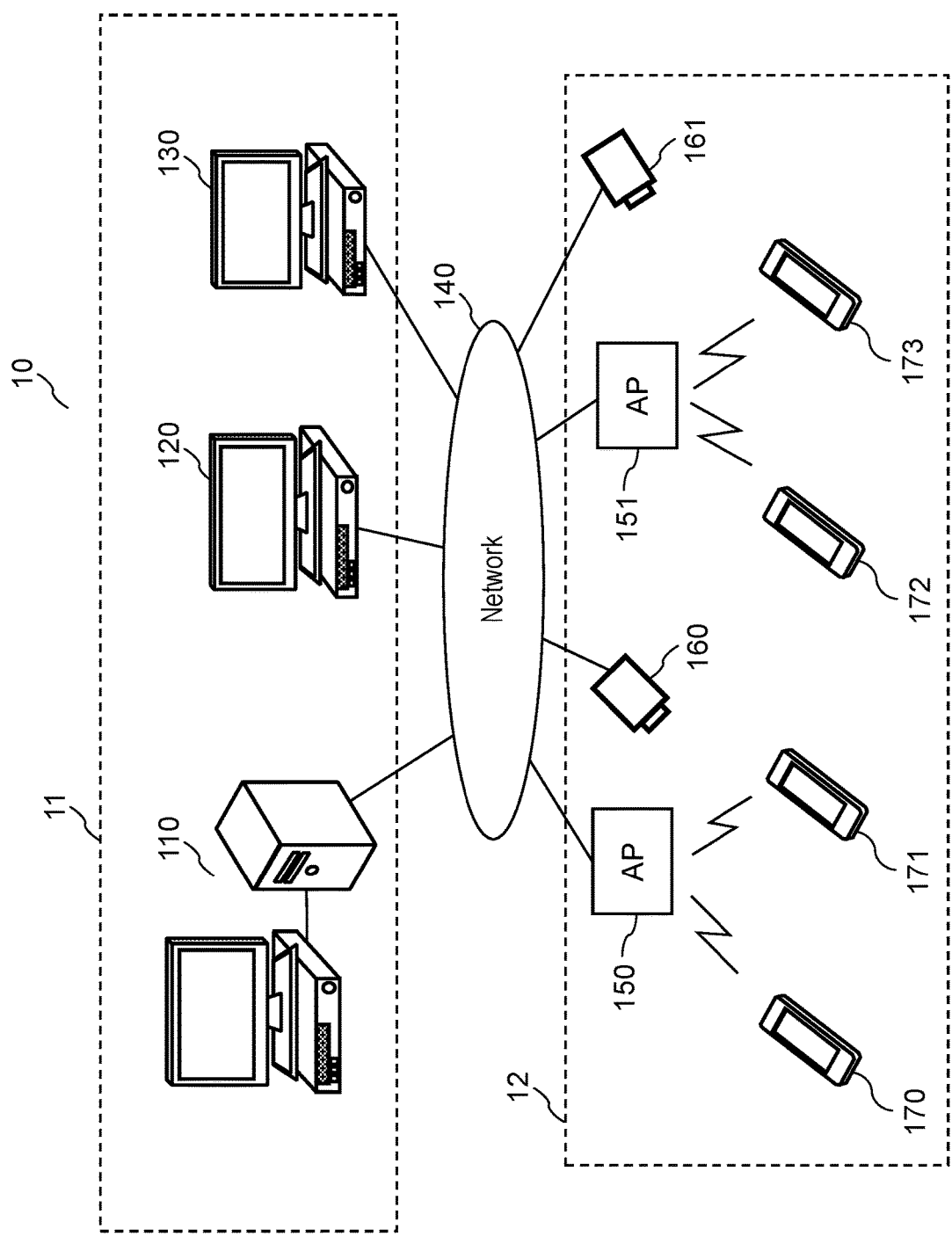
FIG. 1 is a diagram showing a configuration example of a network operation management system according to a first exemplary embodiment.

The conventional wireless LAN system has the following problem.

For example, in Japanese Patent No. 4,215,600, if there is an obstacle that inhibits communication between the wireless terminal and the AP as a failure factor of preventing wireless communication, the inhibition factor cannot be narrowed down based only on the operational status. Further, a user of the wireless terminal may not remember a usage situation in a case of deterioration in communication quality. For this reason, a communication environment at the time of deterioration in communication quality cannot be replicated, and it takes time to narrow down the failure factor.

In order to solve such a problem, the present disclosure provides a network operation management system, a network operation management apparatus, and a network operation management method, which can easily narrow down a failure factor by using a usage situation of a wireless terminal in addition to an operational status.

Hereinafter, exemplary embodiments will be described in detail with reference to the drawing as appropriate. However, a description more detailed than necessary may be omitted. For example, a detailed description of an already well known matter or a repeated description of substantially the same configuration may be omitted. This is for preventing the following description from being needlessly long, and facilitating understanding of a person skilled in the art.

Note that the attached drawings and the following description are provided in order for a person skilled in the art to fully understand the present disclosure, and are not intended to restrict a subject matter described in the scope of the claims.

The present disclosure will be described as an example a case where an operator uses a wireless terminal in a working area which establishes a wireless LAN system. It is assumed that the working area is a factory for manufacturing products, and that at least one base station and at least one monitoring camera are installed in the factory. It is also assumed that the operator is managing inventory of products manufactured in the factory, by using a wireless terminal. Inventory information input by the operator is transmitted to an inventory management server installed in a management division outside the factory, and is managed by an administrator in the management division. The administrator also manages an operational status of a wireless LAN system in the factory.

First Exemplary Embodiment

In a first exemplary embodiment, a description will be given by taking as an example a case where there are four wireless terminals in the factory and each of the wireless terminals is used by a different operator to manage inventory.

[1-1. Configuration]
[1-1-1. Configuration of Network Operation Management System]

FIG. 1 is a diagram showing a configuration example of network operation management system 10 according to a first exemplary embodiment.

In FIG. 1, network operation management system 10 is a system for managing, in management division 11, an operational status of a wireless LAN system in factory 12. In management division 11, video image management server 110 as a video image management unit and wireless management server 120 as a wireless management unit and a determination unit, are installed. In factory 12, two APs 150, 151 as base stations are installed, and two monitoring cameras 160, 161 as imaging units are installed. Further, in factory 12, four wireless terminals 170, 171, 172, 173 are used, and a wireless LAN system establishes with two APs 150, 151.

As constituent elements accompanying network operation management system 10, FIG. 1 also shows inventory management server 130 and network 140 which are installed in management division 11.

Network 140 is a communication path for connecting video image management server 110, wireless management server 120, and inventory management server 130 with APs 150, 151 and monitoring cameras 160, 161. Network 140 is the Internet, for example.

Inventory management server 130 is connected with wireless terminals 170, 171, 172, 173 used by the operators in factory 12, and manages inventory information in factory 12. Inventory management server 130 receives inventory information transmitted from wireless terminals 170, 171, 172, 173, and displays the inventory information managed, in accordance with operation of an administrator. Inventory management server 130 is an application server for managing inventory of products manufactured in factory 12.

Video image management server 110 records video images transmitted from monitoring cameras 160, 161 via network 140. Video image management server 110 is connected with wireless management server 120 via network 140, and records operational information transmitted from wireless management server 120 in association with the video images received from monitoring cameras 160, 161. Video image management server 110 includes a display, and displays the recorded video image and operational information by an operation of the administrator.

Wireless management server 120 is connected with APs 150, 151 via network 140, and receives operational information from wireless terminals 170, 171, 172, 173, and manages the operational information. Wireless management server 120 manages the operational information in association with an obtained date. Herein, as the operational information, at least one of a received signal strength indication (RSSI), a signal-to-noise ratio (SNR), a packet error rate (PER), an interference amount, a load condition, a throughput, and association information indicating that a wireless terminal is connected to AP, for example, is used. In the present exemplary embodiment, an RSSI is used as the operational information.

Each of monitoring cameras 160, 161 is installed to be fixed in factory 12, and captures a video image in a predetermined sight. Each of monitoring cameras 160, 161 transmits a captured video image, together with a captured date, to video image management server 110 via network 140.

Each of wireless terminals 170, 171, 172, 173 is portable terminal by the operator. Each of wireless terminals 170, 171, 172, 173 is wirelessly connected with AP 150 or AP 151, and transmits inventory information of products and the like, which are input by the operator, to inventory management server 130 via network 140. Further, wireless terminals 170, 171, 172, 173 are connected with wireless management server 120 via network 140, and transmits operational information. Wireless terminals 170, 171, 172, 173 are, for example, handy terminals, tablet terminals, smart phones, or the like.

[1-1-2. Configuration of Wireless Management Server]

Figure 2:
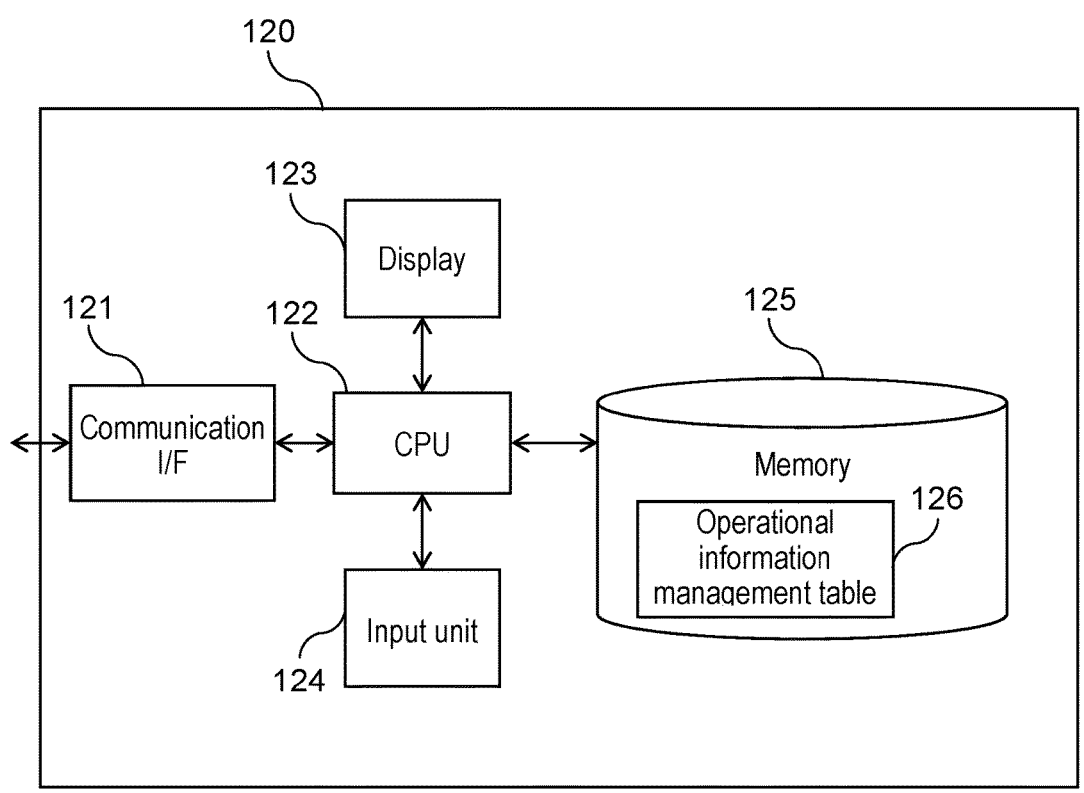
FIG. 2 is a block diagram showing a configuration example of a wireless management server according to the first exemplary embodiment.

Next, wireless management server 120 will be described in detail. FIG. 2 is a block diagram showing a configuration example of wireless management server 120 according to the first exemplary embodiment. FIG. 3 is a diagram showing an example of an operational information management table.

As shown in FIG. 2, wireless management server 120 includes communication interface (I/F) 121, Central Processing Unit (CPU) 122, display 123, input unit 124, and memory 125. Further, memory 125 stores operational information management table 126.

Communication I/F 121 is a communication processing unit that communicates with video image management server 110 and APs 150, 151 via network 140. In the present exemplary embodiment, communication I/F 121 is used for receiving operational information transmitted from APs 150, 151, and transmitting operational information to video image management server 110.

CPU 122 is a controller for controlling each of constituent elements in wireless management server 120, and includes a non-volatile memory in which a program is stored, a non-volatile memory which is a temporary storage region for executing a program, an input/output port, a processor for executing a program, and the like. CPU 122 manages operational information received from APs 150, 151 in operational information management table 126. CPU 122 determines whether the received operational information is information indicating a connection failure of wireless communication. If it is determined as information indicating a connection failure, CPU 122 transmits the determined operational information as failure information to video image management server 110.

Further, memory 125 is a storage apparatus for holding operational information management table 126.

As shown in FIG. 3, operational information management table 126 includes an obtained date (Date), an ID uniquely identifying an AP (AP_ID), an ID of a wireless terminal (terminal ID), and an RSSI during communication.

Note that operational information management table 126 may include other operational information such as an SNR.

Herein, AP_1 is AP_ID of AP 150, and AP_2 is AP_ID of AP_151 in FIG. 3. Further, 170*a* is terminal ID of wireless terminal 170, 170*b* is terminal ID of wireless terminal 171, 170*c* is terminal ID of wireless terminal 172 and 170*d* is terminal ID of wireless terminal 173. Moreover, R11, R12, R13, R21, R22, R23, R31, R32, R33, R41, R42, and R43 indicate RSSI values during communication.

Returning to the description of FIG. 2, display 123 is a display output apparatus including a display screen such as a Liquid Crystal Display (LCD).

Input unit 124 is an input apparatus for receiving an instruction from a user, such as a button or a touch panel.

[1-1-3. Configuration of Video Image Management Server]

Figure 4:
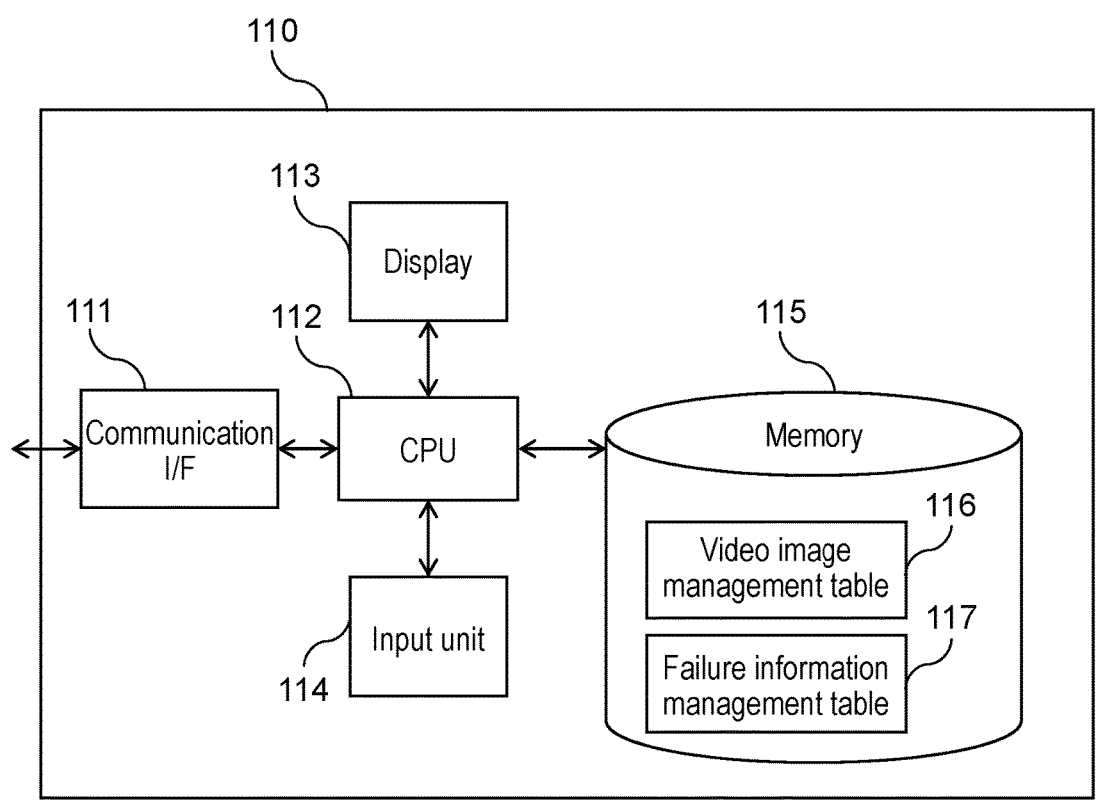
FIG. 4 is a block diagram showing a configuration example of a video image management server according to the first exemplary embodiment.

Next, video image management server 110 will be described in detail. FIG. 4 is a block diagram showing a configuration example of video image management server 110 according to the first exemplary embodiment. FIG. 5 is a diagram showing an example of a video image management table. FIG. 6 is a diagram showing an example of a failure information management table.

In FIG. 4, video image management server 110 includes communication I/F 111, CPU 112, display 113, input unit 114, and memory 115. Further, memory 115 stores video image management table 116 and failure information management table 117.

Communication I/F 111 is a communication processing unit that communicates with wireless management server 120 and monitoring cameras 160, 161 via network 140. In the present exemplary embodiment, communication I/F 111 is used for receiving failure information transmitted from wireless management server 120, and receiving video images captured by monitoring cameras 160, 161.

CPU 112 is a controller for controlling each of constituent elements in video image management server 110, and includes a non-volatile memory in which a program is stored, a non-volatile memory which is a temporary storage region for executing a program, an input/output port, a processor for executing a program, and the like. In the present exemplary embodiment, CPU 112 stores video images received from monitoring cameras 160, 161 into memory 115, and manages the stored video images by video image management table 116. CPU 112 manages failure information received from wireless management server 120 in association with the video image, in failure information management table 117. Further, CPU 112 displays the video image and the failure information, stored in memory 115, on display 113.

Memory 115 is a storage apparatus for holding video image management table 116, failure information management table 117, a not-shown video image, and the like.

As shown in FIG. 5, video image management table 116 is a table that includes a captured date (Date) when each of monitoring cameras 160, 161 captured a video image, and a file name (Video image file) uniquely identifying a video image captured by each of the cameras. Video image management table 116 manages the captured date in association with the video image.

Note that video image management table 116 may include information for identifying the monitoring camera which has captured the video image.

As shown in FIG. 6, failure information management table 117 is a table including a date (Date) when a connection failure occurred, a file name (Video image file) uniquely indicating a video image captured at that date, an ID (AP_ID) uniquely indicating an AP that performed wireless communication at that date, an ID of a wireless terminal (Terminal ID) that performed wireless communication at that date, and a table that includes an RSSI at the time of the connection failure.

Note that failure information management table 117 may include other operational information such as an SNR.

Display 113 is a display output apparatus including a display screen such as an LCD. Input unit 114 is an input apparatus for receiving an instruction from the user, such as a button or a touch panel.

[1-1-4. AP]

Figure 7:
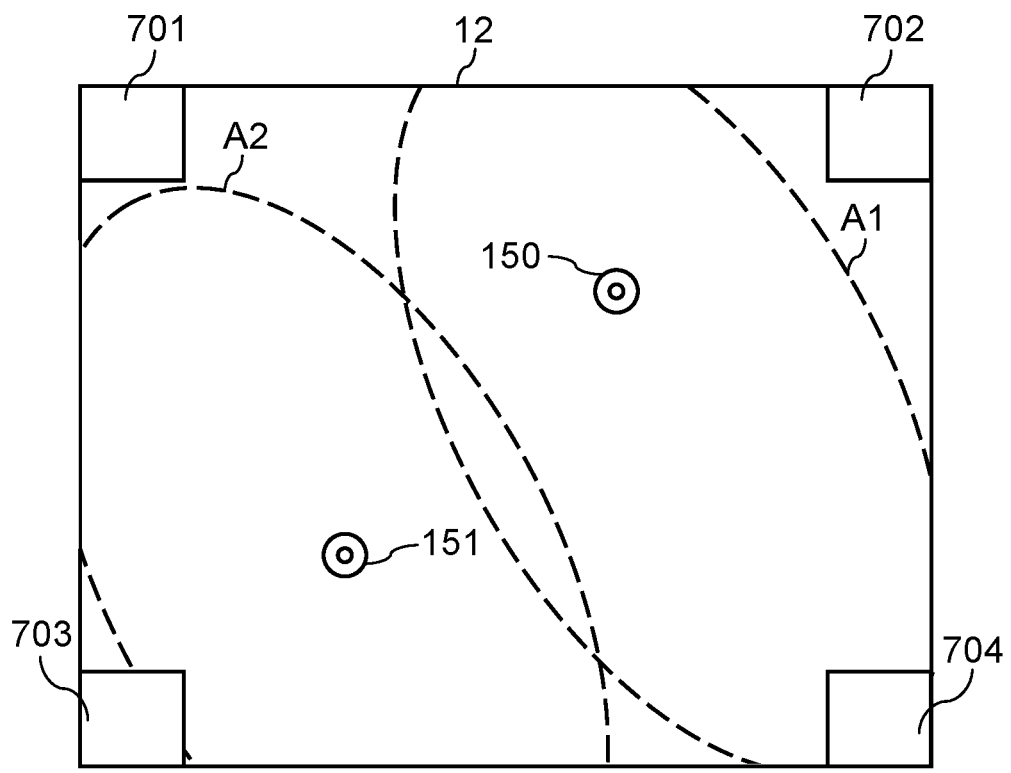
FIG. 7 is a diagram showing an example of cell ranges of APs according to the first exemplary embodiment.

FIG. 7 is a diagram showing an example of so-called cell ranges, which are ranges of access by transmitted signals of APs, according to the first exemplary embodiment. As shown in FIG. 7, APs 150, 151 are installed in factory 12. And there are pillars 701, 702, 703, 704 in four corners in factory 12. As show in FIG. 7, the cell range of AP 150 is region A1, and the cell range of AP 151 is region A2.

In the present exemplary embodiment, if the operator works with a wireless terminal in region A1, the wireless terminal makes wireless communication with AP 150. Similarly, if the operator works with a wireless terminal in region A2, the wireless terminal makes wireless communication with AP 151.

[1-1-5. Monitoring Camera]

Figure 8:
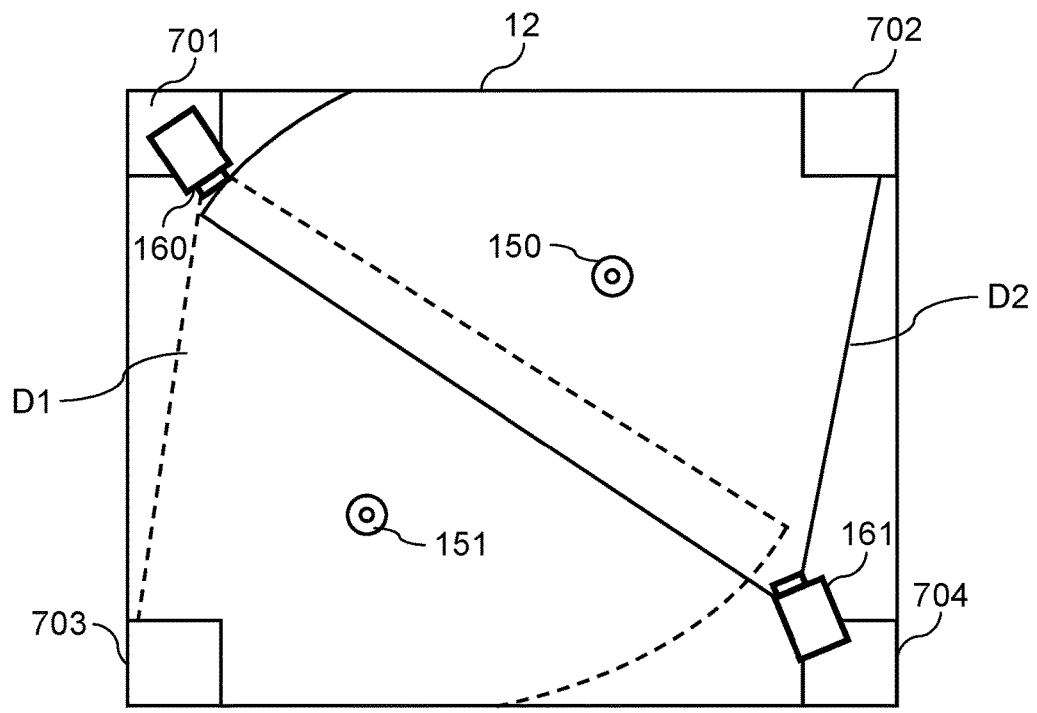
FIG. 8 is a diagram showing an example of monitoring ranges of monitoring cameras according to the first exemplary embodiment.

FIG. 8 is a diagram showing an example of monitoring ranges of the monitoring cameras according to the first exemplary embodiment. As shown in FIG. 8, there are pillars 701, 702, 703, 704 in four corners in factory 12. And monitoring camera 160 is installed to be fixed on pillar 701, and monitoring camera 161 is installed to be fixed on pillar 704. In FIG. 8, a monitoring range of monitoring camera 160 is region D1, and a monitoring range of monitoring camera 161 is region D2.

That is, in the first exemplary embodiment, monitoring camera 160 captures a video image in the cell range of AP 151, and monitoring camera 161 captures a video image in the cell range of AP 150.

[1-2. Operation]

A description will be given of operation of network operation management system 10 configured as above, namely, a network operation management method.

[1-2-1. Operation of Whole Wireless LAN System]

Figure 9:
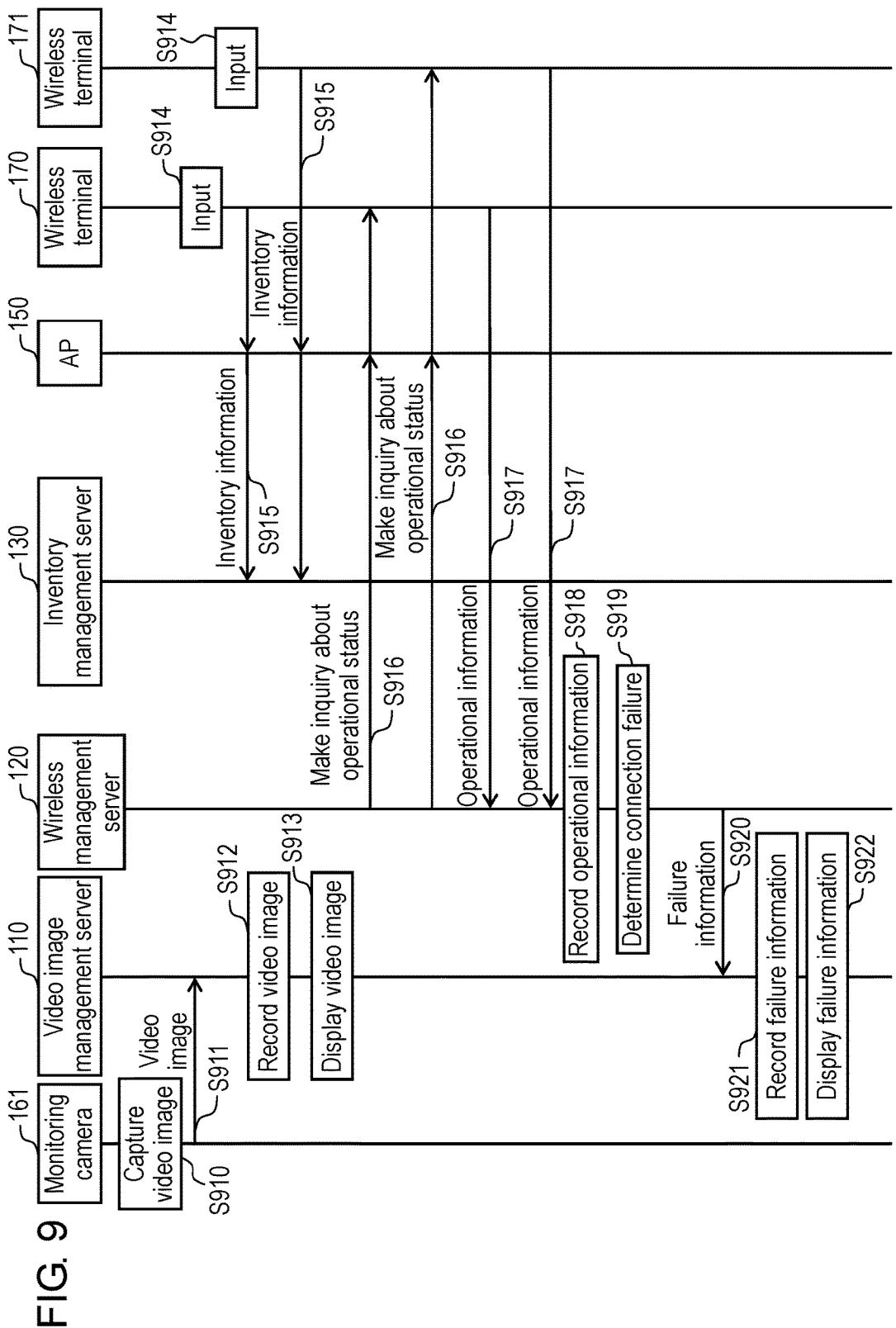
FIG. 9 is a communication sequence diagram describing operation of the network operation management system according to the first exemplary embodiment.

FIG. 9 is a communication sequence diagram describing operation of network operation management system 10 according to the first exemplary embodiment. FIG. 9 shows communication procedures of video image management server 110, wireless management server 120, inventory management server 130, AP 150, monitoring camera 161, and wireless terminals 170, 171. In FIG. 9, AP 151, monitoring camera 160, and wireless terminals 172, 173 are omitted. It is assumed that AP 151 performs operation similar to that of AP 150, and monitoring camera 160 performs operation similar to that of monitoring camera 161. Further, wireless terminals 172, 173 perform operations similar to those of wireless terminals 170, 171.

(S910) Monitoring camera 161 captures a video image.

(S911) Monitoring camera 161 periodically transmits the captured video image to video image management server 110 via network 140.

(S912) When CPU 112 in video image management server 110 receives the video image from monitoring camera 161, the received video image is recorded into memory 115. CPU 112 manages the recorded video image in association with a captured date, in video image management table 116. Herein, it is assumed that the captured date is transmitted by monitoring camera 161 along with the video image. For example, the captured date is stored in a header unit of a video image data.

Figure 10A:
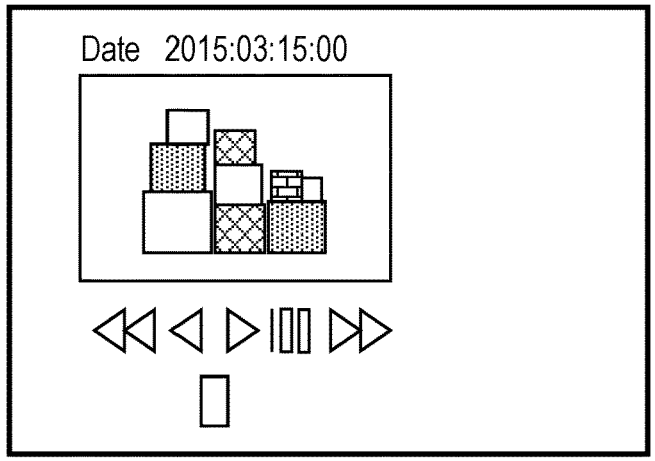
FIG. 10A is a diagram showing an example of a screen displayed on a display in the video image management server according to the first exemplary embodiment.

(S913) Further, CPU 112 displays the recorded video image on display 113. Herein, FIG. 10A is a diagram showing an example of a screen displayed on display 113 in video image management server 110 according to the first exemplary embodiment. As shown in FIG. 10A, the video image recorded in memory 115 is displayed on display 113. In FIG. 10A, a video image of a captured date (Date) of "2015:03:15:00" is displayed.

Note that CPU 112 may record the video image into memory 115 and display the video image on display 113 at the same time. Step S910 to Step S913 are repeatedly performed at predetermined intervals.

(S914) Each of the operators with wireless terminals 170, 171 takes inventory and inputs inventory information in wireless terminals 170, 171 at an arbitrary area in the factory.

(S915) The number of merchandise inventory and the like are input by the operator, each of wireless terminals 170, 171 transmits the input information as inventory information to inventory management server 130 through AP 150. Inventory management server 130 manages the inventory information received from AP 150 via network 140. Hence the administrator can manage merchandise inventory control on inventory management server 130 in the management division.

If the inventory information is input by the operator, each of wireless terminals 170, 171 executes processes of Step S914, S915.

Note that each of wireless terminals 170, 171 may collectively transmit a plurality of inventory information by the operator's transmission operation, or the like.

(S916) CPU 122 in wireless management server 120 periodically makes inquiries to wireless terminals 170, 171 about operational status of the wireless terminals through AP 150.

(S917) Each of wireless terminals 170, 171 transmits an operational status with AP 150, an AP_ID of AP 150, and a terminal ID of the wireless terminal as the operational information to wireless management server 120 through AP 150.

(S918) CPU 122 in wireless management server 120 stores the operational information received from wireless terminals 170, 171 into memory 125, and manages the information by operational information management table 126. CPU 122 may display the operational information by the administrator's operation input from input unit 124.

In operational information management table 126 of FIG. 3, it is found that wireless management server 120 sequentially makes inquiries to wireless terminals 170, 171, 173, 174, in turns, about operational information every AT hours, and obtains the operational information.

(S919) On receiving the operational information from wireless terminals 170, 171, CPU 122 in wireless management server 120 determines, for each piece of operational information, whether the operational status is deteriorated, namely, whether a connection failure exists.

(S920) If it is determined that a connection failure exists, wireless management server 120 transmits the determined operational information as failure information to video image management server 110 via network 140.

Figures 11, 12:
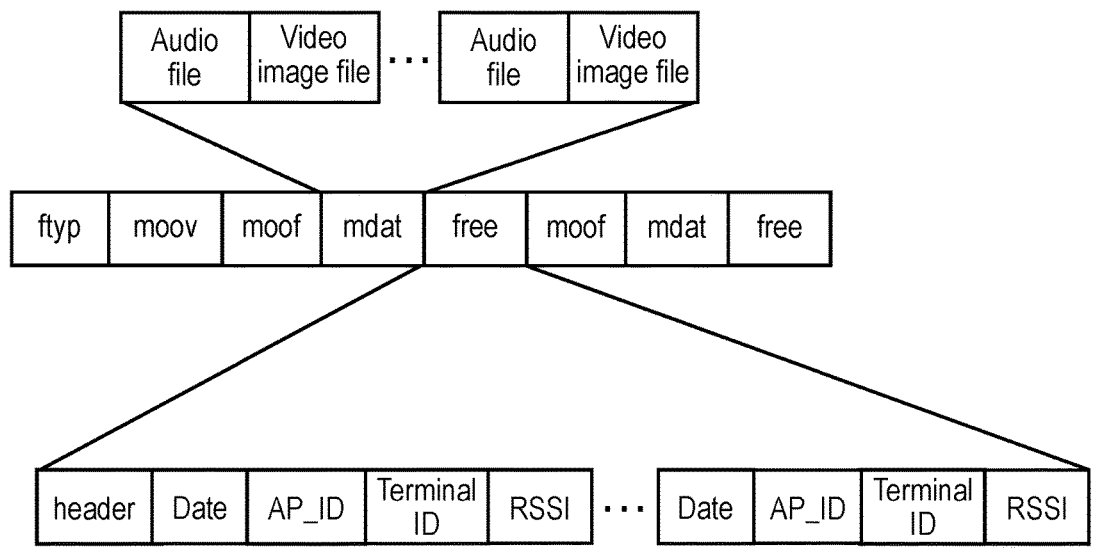
FIG. 11 is a diagram showing an example of failure information according to the first exemplary embodiment.
FIG. 12 is a diagram describing an example of a video image format in which failure information is recorded in association with a video image, according to the first exemplary embodiment.

FIG. 11 is a diagram showing an example of failure information according to the first exemplary embodiment. As shown in FIG. 11, the failure information shows that a received signal strength indication in wireless communication between AP 150, that AP_ID is AP_1, and wireless terminal 170, that a terminal ID is 170a, is R12 at time T2 of Mar. 20, 2015.

(S921) On receiving failure information from wireless management server 120, CPU 112 in video image management server 110 records, into failure information management table 117, the received failure information in association with a video image captured by monitoring camera 160. CPU 112 associates the failure information with the video image by date.

Herein, a description will be given of a video image format in which failure information is recorded in association with a video image captured by monitoring camera 160. FIG. 12 is a diagram describing an example of a video image format in which failure information is recorded in association with a video image captured by monitoring camera 160, according to the first exemplary embodiment. As shown in FIG. 12, if a video image file is recorded in conformity to Moving Picture Experts Group-4 (MPEG-4) standard, the video image file is stored in "mdat". The failure information is stored into "free" located subsequently to "mdat". As shown in FIG. 12, the failure information includes a header at the top, and sequentially stores a set of a date, an AP_ID, a terminal ID, and an RSSI. By utilizing the existing file format in such a manner, it is possible to store the failure information.

Failure information management table 117 in FIG. 6 shows that an RSSI value is R12 in wireless communication between AP 150 that AP_ID is AP_1 and wireless terminal 170 that a terminal ID is 170a at time T2 of Mar. 20, 2015, and shows that a video image of a usage situation of wireless terminal 170 during failure is video image file Video 1-2.

Figure 10B:
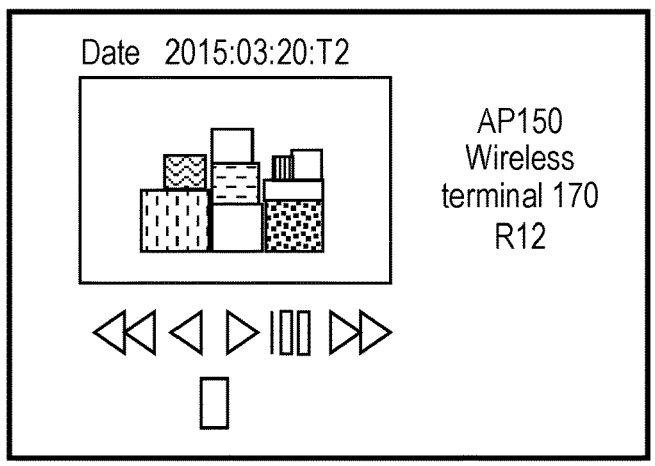
FIG. 10B is a diagram showing another example of the screen displayed on the display in the video image management server according to the first exemplary embodiment.

(S922) CPU 112 in video image management server 110 displays the video image associated with the failure information, on display 113. FIG. 10B is a diagram showing another example of a screen displayed on display 113 in video image management server 110 according to the first exemplary embodiment. As shown in FIG. 10B, failure information and a video image associated with the failure information are displayed on display 113, at the same time. FIG. 10B shows, as the failure information, that an RSSI value is R12 in wireless communication between AP 150 and wireless terminal 170 at time T2 of Mar. 20, 2015.

Figure 10C:
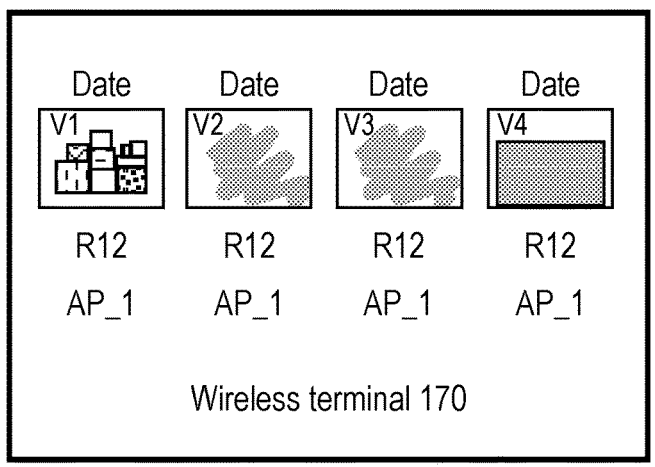
FIG. 10C is a diagram showing still another example of the screen displayed on the display in the video image management server according to the first exemplary embodiment.

Further, CPU 112 in video image management server 110 may display, on display 113, the failure information and the video image associated with the failure information by the administrator's operation input from input unit 124. FIG. 10C is a diagram showing still another example of a screen displayed on display 113 in video image management server 110 according to the first exemplary embodiment. In FIG. 10C, a plurality of video images and a plurality of pieces of failure information, which coincide with a condition specified by the administrator, are displayed.

[1-2-2. Determination of Connection Failure]

Figure 13:
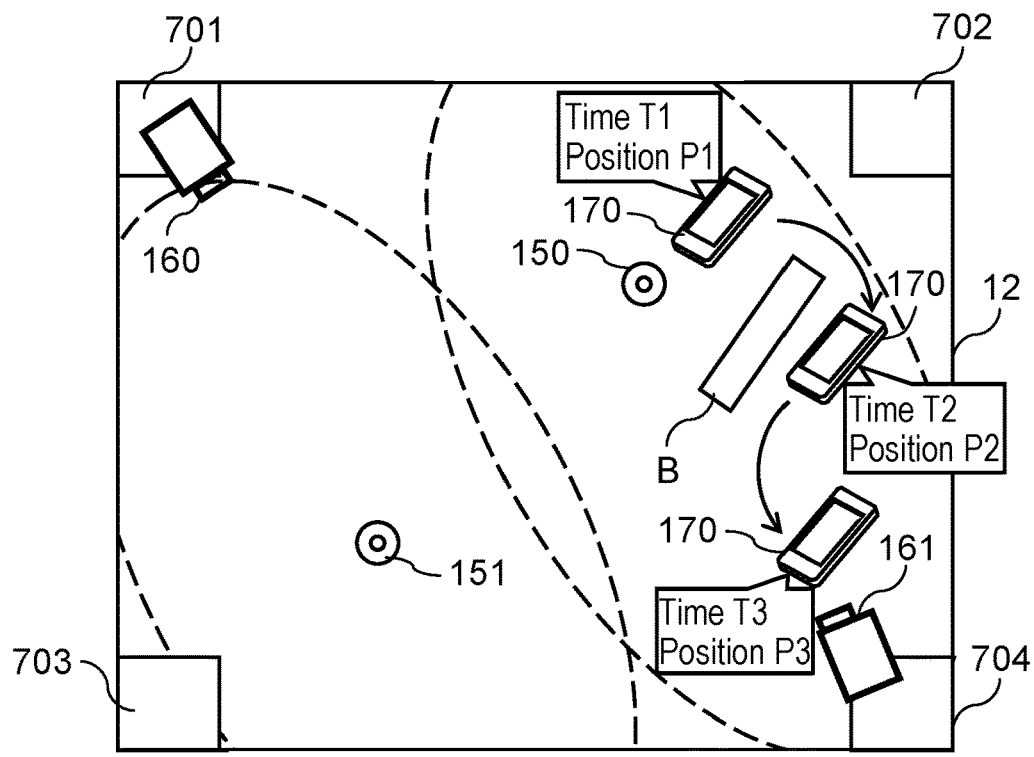
FIG. 13 is a diagram describing determination of the presence of the failure information according to the first exemplary embodiment.
Figure 14:
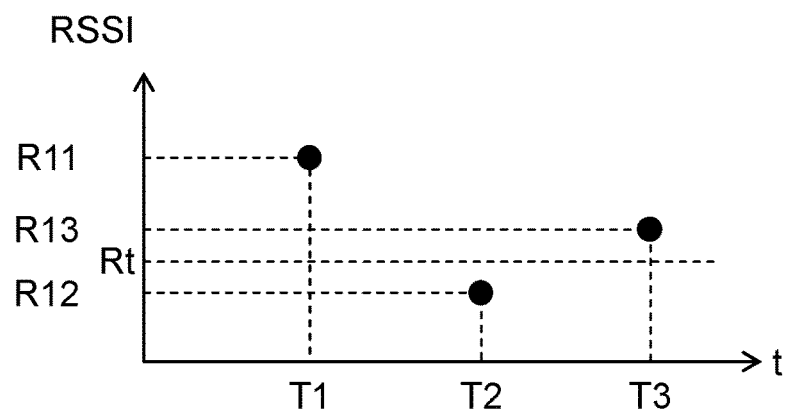
FIG. 14 is a diagram showing an example of time-dependent change of RSSI in a wireless terminal according to the first exemplary embodiment.

Next, a detailed description will be given of the determination of the connection failure in Step S919. FIG. 13 is a diagram describing the determination of the presence of the failure information according to the first exemplary embodiment. FIG. 14 is a diagram showing an example of time-dependent change of RSSI in the wireless terminal according to the first exemplary embodiment.

FIG. 13 shows a case where the operator with wireless terminal 170 works while moving the position in factory 12. Obstacle B is placed in factory 12. The operator with wireless terminal 170 works at position P1 near AP 150 at time T1. Thereafter, the operator moves to position P2 in the vicinity of obstacle B and works at time T2. Further, the operator moves to position P3 in the vicinity of monitoring camera 161 and works at time T3.

FIG. 14 shows an RSSI at each time in the case where the operator with wireless terminal 170 moves as described in FIG. 13. In FIG. 14, the RSSI at time T1 is R11, the RSSI at time T2 is R12, and the RSSI at time T3 is R13.

As shown in FIG. 13, if wireless terminal 170 used by the operator moves from position P1 to position P2, wireless terminal 170 is farther away from AP 150. If wireless terminal 170 further moves to position P3, wireless terminal 170 is farther away from AP 150. That is, as the time passes from time T1 to time T2 and to time T3, wireless terminal 170 become farther away from AP 150. Further, there is no obstacle between AP 150 and wireless terminal 170 if wireless terminal 170 is at position P1 at time T1 and is at position P3 at time T3. In contrast, obstacle B exists between AP 150 and wireless terminal 170 if wireless terminal 170 is at position P2 at time T2. In this case, attenuation of a wireless signal due to obstacle B is larger than attenuation of a wireless signal due to a distance, and hence the RSSIs are: R11>R13>R12.

In the first exemplary embodiment, if the RSSI value is smaller than threshold Rt, it is determined that the operational status of wireless terminal 170 is deteriorated. Therefore, the RSSI value R12 at time T2 is smaller than threshold Rt. CPU 122 in wireless management server 120 determines that a connection failure exists, and transmits the operational information of time T2 as failure information to video image management server 110 via network 140.

[1-2-3. Narrowing Down Failure Factor]

In Step S922, on accepting an operation of displaying failure information from input unit 114, CPU 112 in video image management server 110 extracts a video image and failure information, which coincides with a condition input from input unit 114, from failure information management table 117. CPU 112 then displays the extracted video image and the extracted failure information on display 113. As the condition for extraction, the date, the AP_ID, the terminal ID, or the like is used. If the condition is the date, CPU 112 extracts a video image which matches with the input date and failure information associated with the video image in failure information management table 117. CPU 112 then reads the information from memory 115 and displays the read information on display 113.

As shown in FIG. 10C, all video images V1, V2, V3, V4 and the failure information, which coincides with the condition, are displayed on display 113 at the same time.

The administrator analyzes a cause of the failure based on the video images V1, V2, V3, V4 and the failure information. For example, it is assumed that video image V4 is the video image captured at position P2 at time T2, shown in FIG. 13. In this case, obstacle B is captured in video image V4. The administrator can guess that the failure factor is obstacle B, by looking at this video image. That is, it can be easily seen that the failure factor of the connection failure at position P2 at time T2 is the operator working in front of obstacle B. In this case, the administrator can reduce the occurrence of the connection failure by moving obstacle B to a position where obstacle B does not obstruct communication with AP 150. Alternatively, the administrator can also change AP 150 to a position where AP 150 is less affected by the obstacle.

Further, for example, if someone or goods exists between the AP and the wireless terminal in a displayed video image during failure, the administrator can determine that the failure is temporary and there is no need for taking a countermeasure.

[1-3. Effects and the Like]

As described above, in the present exemplary embodiment, wireless management server 120 obtains operational information of wireless terminals 170, 171, 172, 173, and manages the obtained operational information in association with obtained date in operational information management table 126. Out of the operational information, wireless management server 120 transmits operational information, which indicates a connection failure, as failure information to video image management server 110.

Video image management server 110 receives video images captured by monitoring cameras 160, 161 and captured date, and manages the video images in association with the captured date in video image management table 116. Video image management server 110 obtains failure information received from wireless management server 120, and manages the failure information in association with a video image in failure information management table 117. Video image management server 110 extracts, from failure information management table 117, a video image and failure information, associated with a predetermined date, and displays the extracted video image and the extracted failure information on display 113.

Accordingly, when abnormality occurs in the wireless LAN system, the administrator can check a video image showing information of an operational status and a usage situation of the wireless terminal at the same time as the occurrence of abnormality.

Hence, after the connection failure the administrator can grasp a status in case of connection failure and thereby easily narrow down a failure factor.

Second Exemplary Embodiment

If a plurality of base stations in installed in the working area, signal interference occurs in a place where cell ranges of the plurality of base stations overlap. Therefore deterioration in operational status of the wireless terminal may cause. In the present exemplary embodiment, a description will be given of analysis of a failure factor in a case where cell ranges of at least two base stations overlap and signal interference occurs.

[2-1. Configuration]

Differently from the first exemplary embodiment, in the second exemplary embodiment, a description will be given by taking as an example a case where four base stations and four monitoring cameras are installed in the factory.

[2-1-1. Configuration of Network Operation Management System]

Figure 15:
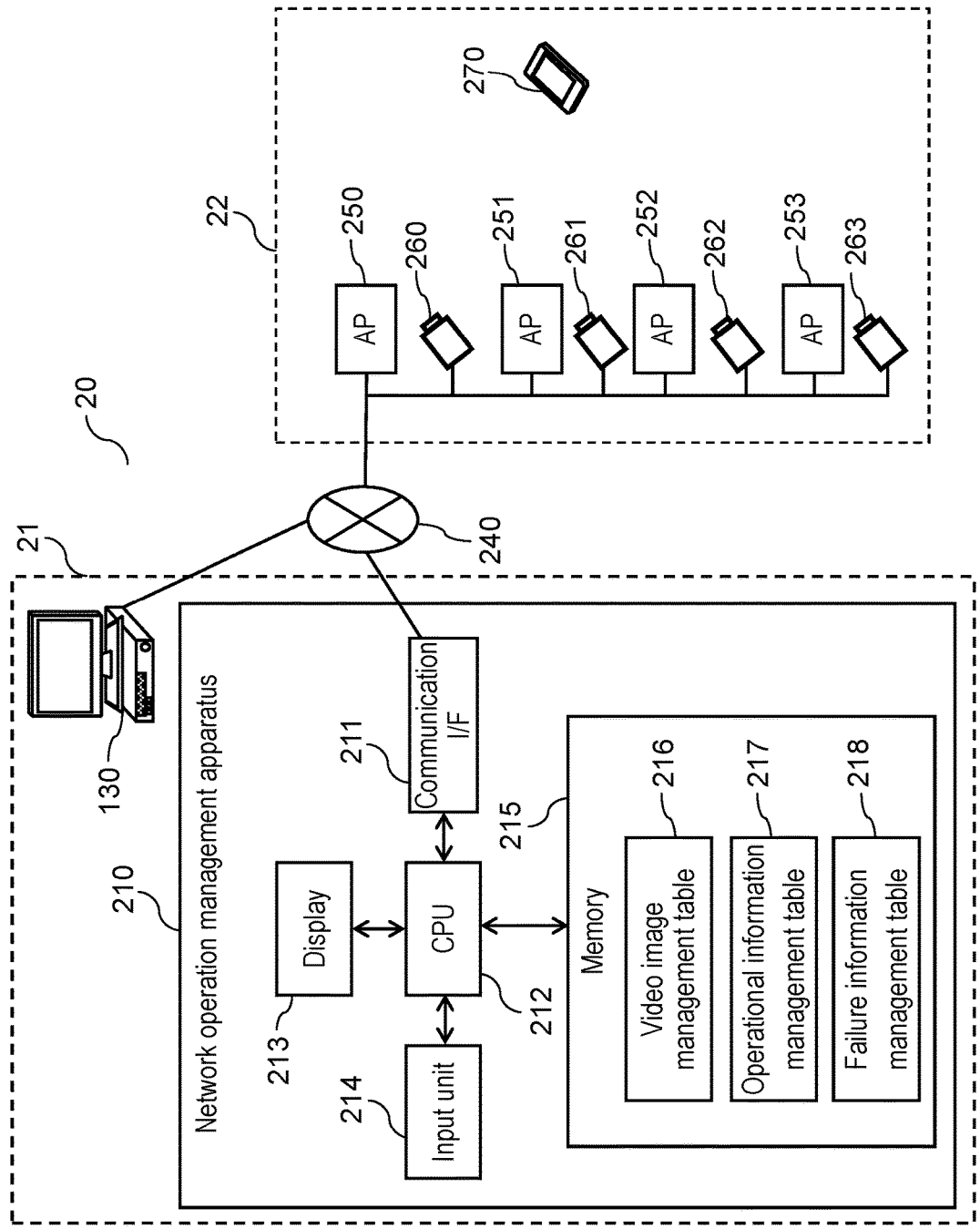
FIG. 15 is a diagram showing a configuration example of a network operation management system according to a second exemplary embodiment.

FIG. 15 is a block diagram showing a configuration example of network operation management system 20 according to a second exemplary embodiment. FIG. 16 is a diagram showing an example of an operational information management table according to the second exemplary embodiment. FIG. 17 is a diagram showing an example of a failure information management table according to the second exemplary embodiment.

In FIG. 15, network operation management system 20 is a system for managing an operational status of a wireless LAN system in factory 22 by network operation management apparatus 210 installed in management division 21. In factory 22, four APs 250, 251, 252, 253 as base stations are installed, and four monitoring cameras 260, 261, 262, 263 as imaging units are installed. Further, in factory 22, wireless terminal 270 is used, and a wireless LAN system establishes with four APs 250, 251, 252, 253.

Note that FIG. 15 also shows, as constituent elements accompanying network operation management system 20, inventory management server 130 which is installed in management division 21 and network 240. The description of inventory management server 130 is omitted since inventory management server 130 operates in the same manner as in the first exemplary embodiment.

In the first exemplary embodiment, the wireless management unit and the determination unit are provided in the wireless management server, and the video image management unit is provided in the video image management server. However, in the second exemplary embodiment, a description will be given by taking as an example a case where the wireless management unit, the determination unit, and the video image management unit are provided in one network operation management apparatus 210, as shown in FIG. 15.

Network 240 is a communication path for connecting network operation management apparatus 210 with APs 250, 251, 252, 253 and monitoring cameras 260, 261, 262, 263. Network 240 is the Internet, for example.

Each of monitoring cameras 260, 261, 262, 263 is installed to be fixed in factory 22, and captures a video image in a predetermined sight. Each of monitoring cameras 260, 261, 262, 263 transmits a captured video image, together with a captured date, to network operation management apparatus 210 via network 240.

Wireless terminal 270 is a portable terminal for the operator. Wireless terminal 270 is wirelessly connected with any of APs 250, 251, 252, 253, and transmits inventory information of products and the like, which are input by the operator, to inventory management server 130 via network 240. Further, wireless terminal 270 transmits operational information to network operation management apparatus 210 via network 240. As the operational information, at least one of a received signal strength indication (RSSI), a signal-to-noise ratio (SNR), a packet error rate (PER), a load condition, a throughput, and association information is used, for example. In the present exemplary embodiment, an RSSI and a PER are used as the operational information. Wireless terminal 270 is, for example, a handy terminal, a tablet terminal, a smart phone, or the like.

Network operation management apparatus 210 includes communication I/F 211, CPU 212, display 213, input unit 214, and memory 215. Further, memory 215 stores video image management table 216, operational information management table 217, and failure information management table 218.

Communication I/F 211 is a communication processing unit that communicates with APs 250, 251, 252, 253 via network 240. In the present exemplary embodiment, communication I/F 211 is used for receiving operational information transmitted from APs 250, 251, 252, 253, and receiving video images transmitted from monitoring cameras 260, 261, 262, 263.

CPU 212 possesses functions of the wireless management unit, the determination unit, and the video image management unit. CPU 212 is a controller for controlling each of constituent elements in network operation management apparatus 210, and includes a non-volatile memory in which a program is stored, a non-volatile memory which is a temporary storage region for executing a program, an input/output port, a processor for executing a program, and the like. In the present exemplary embodiment, CPU 212 stores operational information received from APs 250, 251, 252, 253 into operational information management table 217. Further, CPU 212 stores video images received from monitoring cameras 260, 261, 262, 263 into memory 215, and manages the video images by using video image management table 216.

Moreover, CPU 212 analyzes the received operational information. If the received operational information is determined to indicate a connection failure, CPU 212 manages a video image corresponding to the determined operational information by using failure information management table 218.

Memory 215 is a storage apparatus for holding video image management table 216, operational information management table 217, and failure information management table 218. Video image management table 216 is similar to video image management table 116 in the first exemplary embodiment, and hence a description of video image management table 216 will be omitted.

As shown in FIG. 16, operational information management table 217 includes an obtained date (Date), an ID uniquely identifying an AP (AP_ID), an ID of a wireless terminal (terminal ID), an RSSI during communication, and a PER during communication.

Note that operational information management table 217 may include other operational information such as an SNR.

Herein, AP_1 is AP_ID of AP250 in FIG. 16. Terminal 270*a* is terminal ID of wireless terminal 270. Further, R11, R12, R13 indicate RSSI values at times T1, T2, T3 during communication, and P11, P12, P13 indicate PER values at times T1, T2, T3 during communication.

As shown in FIG. 17, failure information management table 218 is a table including a date (Date) when a connection failure occurred, a file name (Video image file) uniquely indicating a video image captured at that date, an ID (AP_ID) uniquely indicating an AP that performed wireless communication at that date, an ID of a wireless terminal (Terminal ID) that performed wireless communication at that date, an RSSI at the time of the connection failure, and a table that includes a PER at the time of the connection failure.

Note that failure information management table 218 may include other operational information such as an SNR.

Display 213 is a display output apparatus including a display screen such as an LCD. Input unit 214 is an input apparatus for receiving an instruction from the user, such as a button or a touch panel.

[2-1-2. AP]

Figure 18:
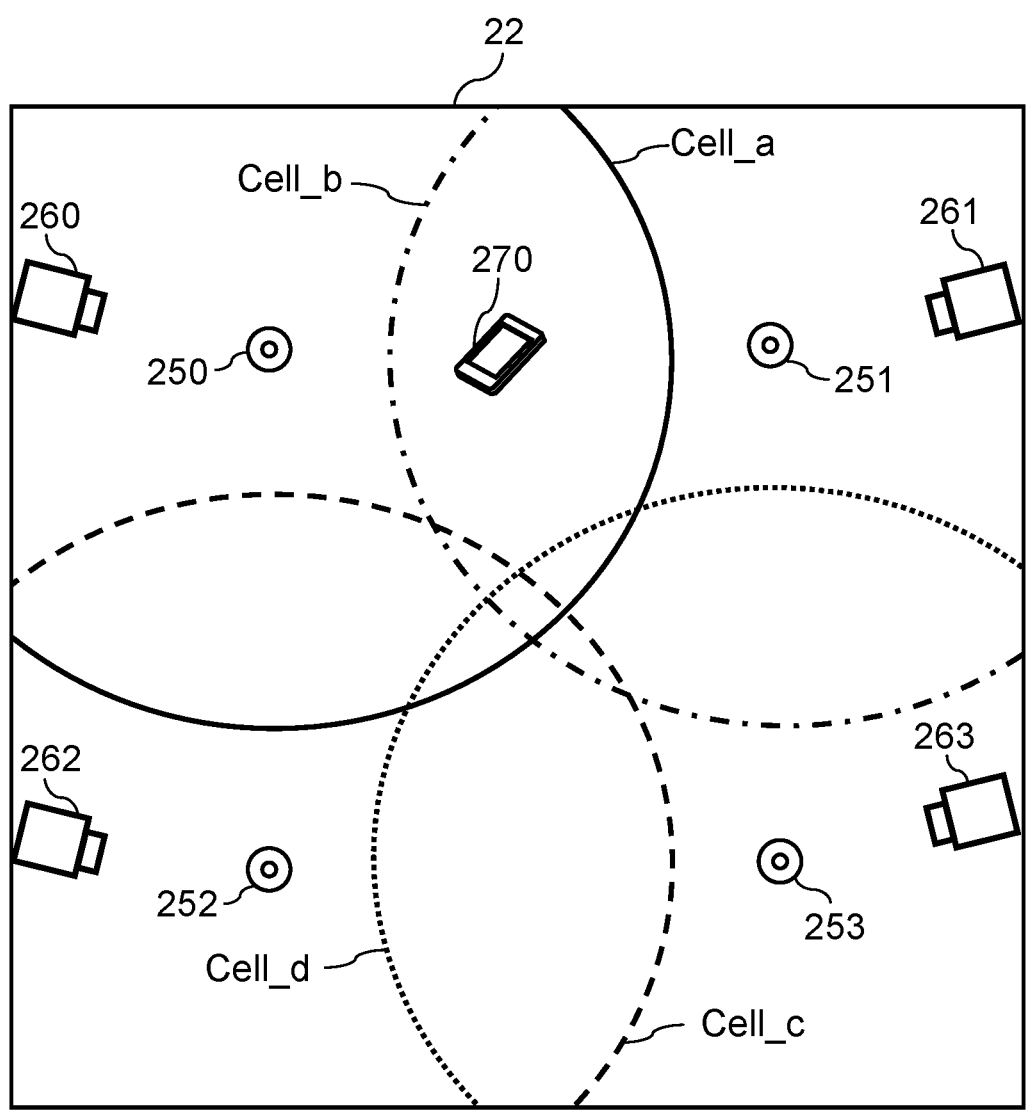
FIG. 18 is a diagram showing an example of cell ranges of APs according to the second exemplary embodiment.

FIG. 18 is a diagram showing an example of cell ranges of APs 250, 251, 252, 253 according to the second exemplary embodiment.

As shown in FIG. 18, APs 250, 251, 252, 253 are installed in factory 22. As shown in FIG. 18, a cell range of AP 250 is a region Cell_a shown by a solid line, a cell range of AP 251 is a region Cell_b shown by a dashed line, a cell range of AP 252 is a region Cell_c shown by a wavy line, and a cell range of AP 253 is a region Cell_d shown by a dotted line.

In the present exemplary embodiment, if the operator with wireless terminal 270 works in factory 22, wireless terminal 270 makes wireless communication with the AP located at the position closest to a position at which the operator works.

FIG. 19 is a diagram describing allocation of frequency channels which can be used in a wireless LAN in a 2.4 GHz band. As shown in FIG. 19, the number of frequency channels which can be used in a wireless LAN in a 2.4 GHz band is 13. Each channel slightly overlaps with other channels, and if channels are allocated such that frequencies of the channels are not overlapped, the number of allocated channels is three at the maximum. Specifically, "Channel 1, Channel 6, Channel 11", "Channel 2, Channel 7, Channel 12", and "Channel 3, Channel 8, Channel 13".

FIG. 20 is a diagram describing combination of frequency channels and APs according to the second exemplary embodiment. As shown in FIG. 20, Channel 1 is allocated to AP 250, Channel 6 is allocated to AP 251, Channel 11 is allocated to AP 252, and Channel 1 is allocated to AP 253. Thereby, overlapping of the cells having the same frequency channel is made small.

[2-1-3. Monitoring Camera]

Figure 21:
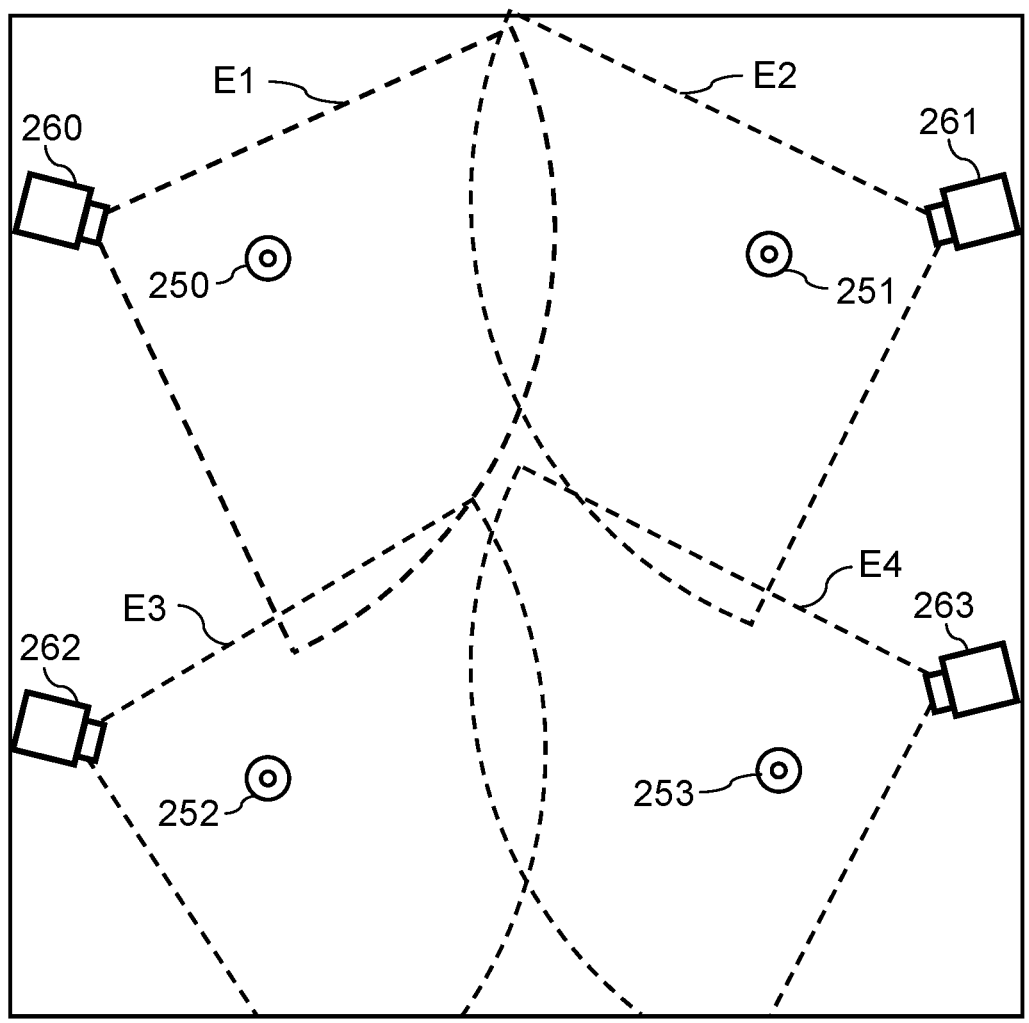
FIG. 21 is a diagram showing an example of monitoring ranges of monitoring cameras according to the second exemplary embodiment.

FIG. 21 is a diagram showing an example of monitoring ranges of the monitoring cameras according to the second exemplary embodiment. As shown in FIG. 21, monitoring cameras 260, 261, 262, 263 are installed to be fixed on walls. In FIG. 21, a monitoring range of monitoring camera 260 is region E1, a monitoring range of monitoring camera 261 is region E2, a monitoring range of monitoring camera 262 is region E3, and a monitoring range of monitoring camera 263 is region E4.

That is, in the second exemplary embodiment, monitoring camera 260 captures a video image in the cell range of AP 250, monitoring camera 261 captures a video image in the cell range of AP 251, monitoring camera 262 captures a video image in the cell range of AP 252, monitoring camera 263 captures a video image in the cell range of AP 253,

[2-2. Operation]

Operation of network operation management system 20 configured as above will be described below.

[2-2-1. Operation of Network Operation Management System]

Figure 22:
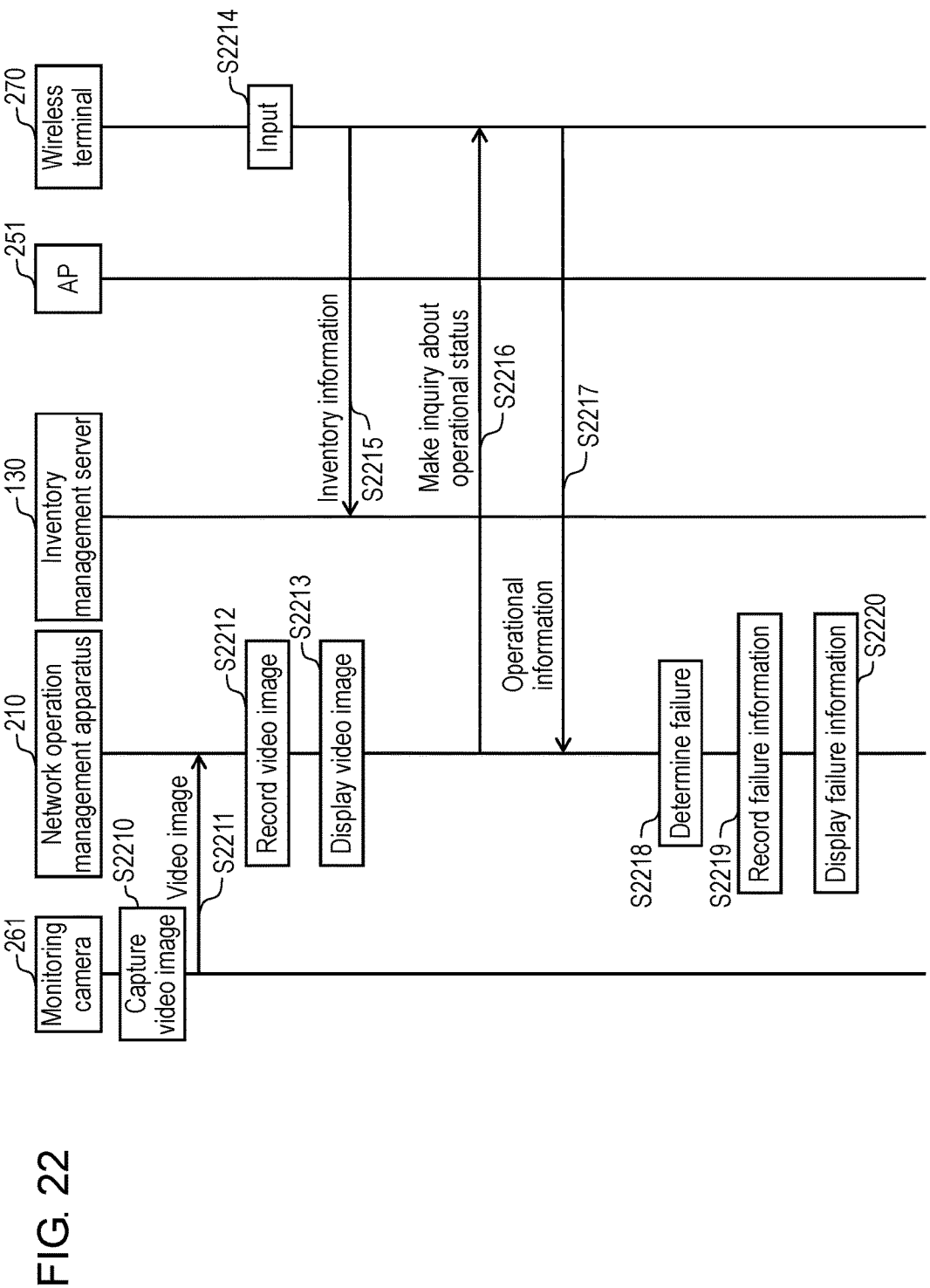
FIG. 22 is a communication sequence diagram describing operation of the network operation management system according to the second exemplary embodiment.

FIG. 22 is a communication sequence diagram describing operation of network operation management system 20 according to the second exemplary embodiment. FIG. 22 shows communication procedures of network operation management apparatus 210, AP 251, monitoring camera 261, wireless terminal 270, and inventory management server 130. In FIG. 22, APs 250, 252, 253 and monitoring cameras 260, 262, 263 are omitted. It is assumed that APs 250, 252, 253 move similarly to AP 251. Further, it is assumed that monitoring cameras 260, 262, 263 move similarly to monitoring camera 260.

(S2210) Monitoring camera 261 captures a video image.

(S2211) Monitoring camera 261 periodically transmits the captured video image to network operation management apparatus 210 via network 240.

(S2212) If CPU 212 in network operation management apparatus 210 receives the video image from monitoring camera 261, the received video image is recorded into memory 215. CPU 212 manages the recorded video image in video image management table 216.

(S2213) Further, CPU 212 displays the recorded video image on display 213.

Note that CPU 212 may record the video image into memory 215 and display the video image on display 213, at the same time. Step S2210 to Step S2213 are repeatedly performed at predetermined intervals.

(S2214) Inventory management server 130 makes communication with wireless terminal 270 via network 240 and AP 251. The operator inputs information with wireless terminal 270 at an arbitrary position in factory 22. In the second exemplary embodiment, similarly to the first exemplary embodiment, the application server is inventory management server 130, and hence the operator inputs the number of merchandise inventory into wireless terminal 270. Hence the administrator can manage merchandise inventory control on inventory management server 130 in management division 21.

(S2215) If the number of merchandise inventory and the like are input by the operator, wireless terminal 270 transmits the input information as inventory information to inventory management server 130 through AP 251. If the inventory information is input by the operator, wireless terminal 270 executes processes of S2214, S2215.

Note that wireless terminal 270 may collectively transmit a plurality of inventory information by the operator's transmission operation, or the like.

(S2216) CPU 212 in network operation management apparatus 210 makes an inquiry to wireless terminal 270 about an operational status of wireless terminal 270 through AP 251.

(S2217) Wireless terminal 270 transmits an operational status with AP 251, an AP_ID of AP 251, and a terminal ID of the wireless terminal 270 as operational information to network operation management apparatus 210 through AP 251.

(S2218) CPU 212 in network operation management apparatus 210 stores the operational information received from wireless terminal 270 into memory 215, and manages the information by operational information management table 217. Then, by using the operational information received from wireless terminal 270, CPU 212 determines whether the operational status is deteriorated.

(S2219) If it is determined that the operational status is deteriorated, CPU 212 records the operational information as failure information in association with a video image captured by monitoring camera 261.

(S2220) CPU 212 displays the video image associated with the failure information on display 213. That is, the present exemplary embodiment is different from the first exemplary embodiment in that transmission of operational information is omitted.

Further, CPU 212 may display the failure information and the video image associated with the failure information on display 213 in accordance with operation of the administrator which is input from input unit 214. If CPU 212 receives operation of displaying failure information by the administrator from input unit 214, CPU 212 extracts a video image which coincides with a condition specified from input unit 214 and failure information, and displays the extracted video image and information on display 213. As the condition for extraction, the date, the AP_ID, the terminal ID, or the like is used. If the condition is the date, CPU 212 extracts a video image which matches with the input date and failure information associated with the video image from failure information management table 218. And then, CPU 212 reads the information from memory 215 and displays the read information on display 213.

[2-2-2. Determination of Connection Failure]

Next, a detailed description will be given of the determination of whether the operational status is deteriorated in Step S2218. In the second exemplary embodiment, a PER is included as operational information in addition to an RSSI described in the first exemplary embodiment.

Figure 23:
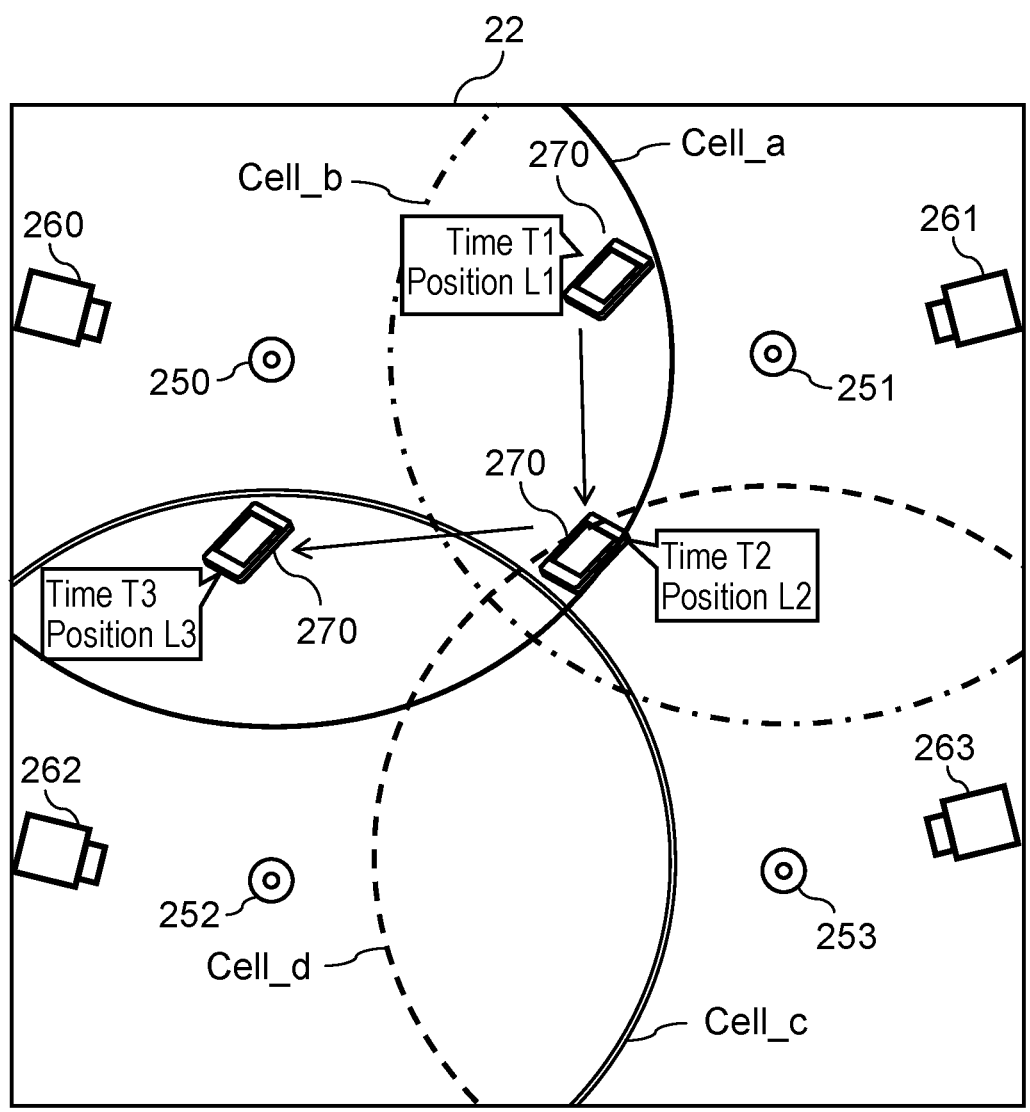
FIG. 23 is a diagram describing determination of whether an operational status is deteriorated, according to the second exemplary embodiment.
Figure 24A:
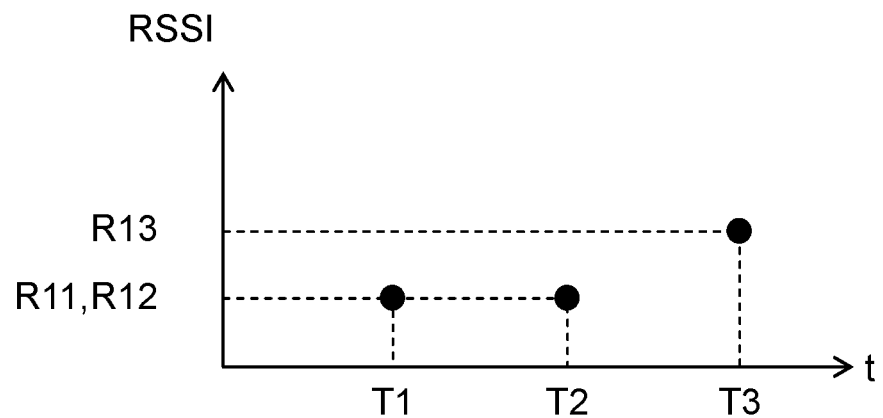
FIG. 24A is a diagram showing an example of time-dependent change of RSSI in a wireless terminal according to the second exemplary embodiment.
Figure 24B:
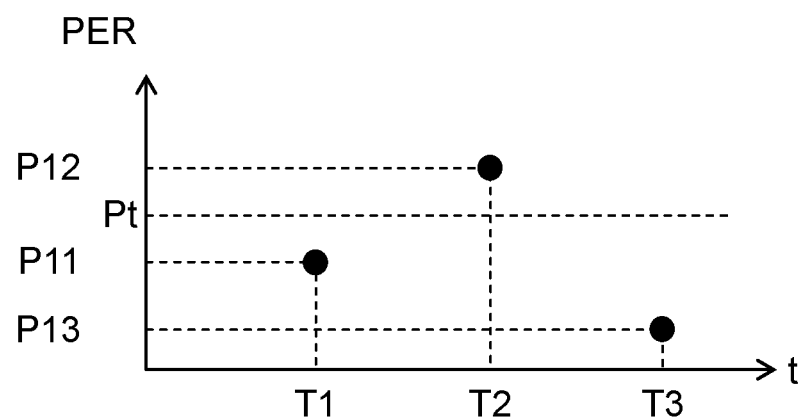
FIG. 24B is a diagram showing an example of time-dependent change of PER in the wireless terminal according to the second exemplary embodiment.

FIG. 23 is a diagram describing determination of whether an operational status is deteriorated, according to the second exemplary embodiment. FIG. 24A is a diagram showing an example of time-dependent change of RSSI in the wireless terminal according to the second exemplary embodiment. FIG. 24B is a diagram showing an example of time-dependent change of PER in the wireless terminal according to the second exemplary embodiment. FIG. 25 is a diagram showing an example of failure information according to the second exemplary embodiment.

FIG. 23 shows a case where the operator with wireless terminal 270 and works while moving the position in factory 22. The operator works with wireless terminal 270 at position L1 close to AP 251 at time T1. Thereafter, the operator moves to position L2 at about the same distance from AP 251 and from AP 253 at time T2. Further, the operator moves to position L3 between AP 250 and AP 252 at time T3.

FIG. 24A shows an RSSI at each time in the case where the operator with wireless terminal 270 moves as described in FIG. 23. In FIG. 24A, the RSSI at time T1 is R11, the RSSI at time T2 is R12, and the RSSI at time T3 is R13. As shown in FIG. 23, position L1 and position L2 are located at almost the same distance from AP 250, and position L3 is at a shorter distance from AP 250 than position L1 and position L2, and hence the RSSIs are: R11=R12<R13.

Further, FIG. 24B shows a PER at each time in the case where the operator with wireless terminal 270 moves as described in FIG. 23. In FIG. 24B, the PER at time T1 is P11, the PER at time T2 is P12, and the PER at time T3 is P13. As shown in FIG. 23, position L1 is a position at which region Cell_a as the cell range of AP 250 and region Cell_b as the cell range of AP 251 overlap. Since Channel 1 is allocated to AP 250 and Channel 6 is allocated to AP 251, signal interference does not occur at position L1.

In contrast, as shown in FIG. 23, position L2 is a position at which region Cell_a as the cell range of AP 250 and region Cell_d as the cell range of AP 253 overlap. Since Channel 1, which is the same frequency channel, is allocated to AP 250 and AP 253, signal interference occurs.

As shown in FIG. 23, position L3 is a position at which region Cell_a as the cell range of AP 250 and region Cell_c as the cell range of AP 252 overlap. Since Channel 1 is allocated to AP 250 and Channel 11 is allocated to AP 252, signal interference does not occur, similarly to position L1. Position L3 is a position closer to AP 250 than position L1, and hence the PER of wireless terminal 270 are eventually: P12>P11>P13.

Herein, If the PER is larger than threshold Pt, CPU 212 determines that the operational status of wireless terminal 270 is deteriorated. CPU 212 determines time T2 at which the PER of P12 is larger than at threshold Pt as a time when the operational status is deteriorated, and stores the PER at time T2 as failure information into failure information management table 218.

FIG. 25 is failure information at this time. FIG. 25 shows as the failure information that the RSSI is R12 and the PER is P12 in wireless communication between AP 251 and wireless terminal 270 at time T2 of Mar. 20, 2015.

[2-2-3. Narrowing Down of Failure Factor]

In Step S2220, on accepting an operation of displaying failure information by the administrator from input unit 214, CPU 212 extracts a video image and failure information, which coincides with a condition input from input unit 214, from failure information management table 218. CPU 212 then displays the extracted video image and the extracted failure information on display 213. As the condition for extraction, the date, the AP_ID, the terminal ID, or the like is used. If the condition is the date, CPU 212 extracts a video image which matches with the input date and failure information associated with the video image in failure information management table 218. CPU 212 then reads the information from memory 215 and displays the read information on display 213.

The administrator analyzes a cause of the failure based on the video image and the failure information. For example, it is assumed that the video image and the failure information at time T2 in FIG. 23 are displayed on display 213. In this case, the administrator can guess that the failure factor is signal interference between AP 250 and AP 253 based on the PER value P12 at this time, and based on a video image that the operator works with wireless terminal 270 at position L2 where region Cell_a as the cell range of AP 250 and region Cell_d as a cell range of AP253 are overlapped. That is, it can be easily seen that the failure factor of the connection failure at position L2 at time T2 is signal interference between AP 250 and AP 253. In this case, for example, in order to prevent signal interference between AP 250 and AP 253, it is possible for the administrator to avoid the failure by narrowing down, for example, one of the cell ranges of AP 250 and AP 253, or both of the cell ranges, so as to prevent the cell ranges from overlapping. Further, it is also possible to avoid the failure by changing one of the installed positions of AP 250 and AP 253, or both of the installed positions, so as to prevent the cell ranges from overlapping. Moreover, it is also possible to avoid the failure by reconsidering channels to be allocated to AP 250 and AP 253.

[2-3. Effects and the Like]

As described above, in the present exemplary embodiment, network operation management apparatus 210 is connected to the wireless LAN system in factory 22, obtains operational information of wireless terminal 270, and manages the obtained operational information in association with obtained date in operational information management table 217. Further, network operation management apparatus 210 manages the video images captured by monitoring cameras 260, 261, 262, 263 in association with the captured date in video image management table 216. Moreover, network operation management apparatus 210 manages the operational information, which indicates a connection failure, as failure information in association with a video image in failure information management table 218. Network operation management apparatus 210 extracts, from failure information management table 218, a video image associated with a predetermined date and failure information, and displays the extracted video image and information.

Accordingly, if abnormality occurs in the wireless LAN system, the administrator can understand a video image of information of an operational status and a usage situation of the wireless terminal at the same time as the occurrence of abnormality. Further, by using the PER for the operational status, the administrator can assume that signal interference has occurred at least between two APs.

Hence, the administrator can grasp the state at the time of a failure after occurrence of the failure, to thereby easily narrow down a failure factor.

Other Exemplary Embodiments

As described above, the first and second exemplary embodiments have been described as exemplification of the present disclosure. However, the technique of the present disclosure is not limited thereto, and is also applicable to an exemplary embodiment in which modification, replacement, addition, omission or the like has been made. Further, it is also possible to combine each of the constituent elements described in the above first and second exemplary embodiments, so as to form a new exemplary embodiment.

Other embodiments will be exemplified below.

In the first exemplary embodiment, wireless management server 120 made inquiries to the wireless terminals 170, 171, 172, 173 about operational information, but wireless management server 120 may make inquiries to APs 150, 151 and APs 150, 151 may respond to the inquiries.

In the first exemplary embodiment, wireless management server 120 possesses a function of the determination unit, but video image management server 110 may possesses that function. In this case, wireless management server 120 transmits all of operational status to video image management server 110.

In the first exemplary embodiment, the description has been given by taking as an example the case where the administrator in the management division seeks a cause of a connection failure, but the present disclosure is not limited thereto. For example, failure information extracted by video image management server 110 on a certain condition and a video image corresponding to the failure information may be transmitted to a terminal set up in a system division which is located in a remote place from the management division and in which the system has been introduced to a working area, via the network. This enables, for example, a person to deal with failures in the system division to analyze a failure factor on the terminal without going to the factory. Hence the person to deal with failures can deal with a failure in the system division except for a connection failure which cannot be dealt with without going to the factory.

Each of the numbers of APs, monitoring cameras and wireless terminals in each of the embodiments is an example, and the present disclosure is not limited the numbers in the embodiments. The AP and the monitoring camera may be installed in accordance with a size and a space of the working area.

Further, the working area is not limited to the factory, and only has to be a place where a wireless terminal is can be used, such as a store, a shop or a school. Moreover, the inventory management server has been described as the example of the application server, but the present disclosure is not limited thereto. The application server only has to be a system for collecting and managing information in the working area, such as a POS (Point Of Sales) system or a production control system.

Moreover, the operation of network operation management apparatus 210 of the second exemplary embodiment may be performed by video image management server 110 and wireless management server 120 of the first exemplary embodiment. Similarly, the operation of video image management server 110 and wireless management server 120 of the first exemplary embodiment may be performed only by network operation management apparatus 210.

Further, the function of the application server in inventory management server 130 of the second exemplary embodiment may be provided to network operation management apparatus 210. Similarly, the function of inventory management server 130 may be provided to video image management server 110 and wireless management server 120 in the first exemplary embodiment.

Moreover, in place of the imaging unit and the base station, a monitoring camera that unifies the imaging unit and the base station, with an AP, may possess two functions.

Since the foregoing embodiments are intended to exemplify the technique in the present disclosure, a variety of changes, replacement, addition, omission, and the like can be made in the scope of the claims and a scope equivalent to the scope of the claims.

What is claimed is:

1. A network operation management system managing an operational status of a wireless Local Area Network (LAN) system including a wireless terminal and at least one base station installed in an arbitrary area, the system comprising:
   at least one camera configured to be installed in the area and to capture a video image in a predetermined sight of the area;
   a wireless management server configured to (i) connect to the base station via a network, (ii) obtain operational information of the wireless terminal, and (iii) manage the obtained operational information in association with an obtained date and time;
   a video image management server configured to (i) connect to the camera via the network, (ii) receive a video image captured by the camera and a captured date and time when the camera captured the video image, and (iii) manage the video image in association with the captured date and time; and
   a display configured to display the video image managed by the video image management server,
   wherein the video image management server obtains the operational information and the obtained date and time from the wireless management server, the video image management server manages the video image in association with the operational information, the video image being associated with the captured date and time which matches with the obtained date and time, and the video image management server extracts the video image and the operational information associated with a predetermined date and time, and
   wherein the display displays the operational information associated with the obtained date and time, and the display displays the video image associated with the captured date and time which matches with the obtained date and time.

2. The network operation management system according to claim 1, wherein the operational information includes at least one of a received signal strength indication, a signal-to-noise ratio, a packet error rate, an interference amount, a load condition, a throughput, and association information.

3. The network operation management system according to claim 1,
   wherein the wireless management server determines that the operational information indicates a connection failure if the operational information does not meet a predetermined condition, and the wireless management server manages the determined operational information and the video image corresponding to the operational information as failure information,
   wherein the video image management server extracts the video image and the operational information, associated with a predetermined date and time, among the failure information, and
   wherein the display displays, at the same time, the operational information associated with the obtained date and time and the video image associated with the captured date and time which matches with the obtained date and time.

4. The network operation management system according to claim 1,
   wherein the video image management server determines that the operational information indicates a connection failure if the operational information does not meet a predetermined condition, the video image management server manages the determined operational information and the video image corresponding to the operational information as failure information, and the video image management server extracts the video image and the operational information, associated with a predetermined date and time, among the failure information, and
   wherein the display displays, at the same time, the operational information associated with the obtained date and time and the video image associated with the captured date and time which matches with the obtained date and time.

5. A network operation management apparatus managing an operational status of a wireless LAN system including a wireless terminal and at least one base station installed in an arbitrary area, the apparatus comprising:
   a wireless management server configured to (i) connect to the base station via a network, (ii) obtain operational information of the wireless terminal, and (iii) manage the obtained operational information in association with an obtained date and time;
   a video image management server configured to (i) receive a video image captured by at least one camera and a captured date and time when the camera captured the video image, the camera being installed in the area and capturing the video image in a predetermined sight of the area, and (iii) manage the video image in association with the captured date and time; and
   a display configured to display the video image managed by the video image management server,
   wherein the video image management server obtains the operational information and the obtained date and time from the wireless management server, the video image management server manages the video image in association with the operational information, the video image being associated with the captured date and time which matches with the obtained date and time, and the video image management server extracts the video image and the operational information associated with a predetermined date and time, and
   wherein the display displays the operational information associated with the obtained date and time and the video image associated with the captured date and time which matches the obtained date and time.

6. The network operation management apparatus according to claim 5, wherein the operational information includes at least one of a received signal strength indication, a signal-to-noise ratio, a packet error rate, an interference amount, a load condition, a throughput, and association information.

7. The network operation management apparatus according to claim 5,
wherein the wireless management server determines that the operational information indicates a connection failure if the operational information does not meet a predetermined condition, and the wireless management server manages the determined operational information and the video image corresponding to the operational information as failure information, and
wherein the video image management server extracts the video image and the operational information, associated with a predetermined date and time, among the failure information.

8. The network operation management apparatus according to claim 5, wherein the video image management server determines that the operational information indicates a connection failure if the operational information does not meet a predetermined condition, the video image management server manages the determined operational information and the video image corresponding to the operational information as failure information, and the video image management server extracts the video image and the operational information, associated with a predetermined date and time, among the failure information.

9. A network operation management method for managing an operational status of a wireless LAN system including a wireless terminal and at least one base station installed in an arbitrary area, the method comprising:
obtaining operational information of the wireless terminal from the base station via a network;
managing the obtained operational information in association with an obtained date and time;
receiving a video image captured by at least one camera installed in the area and captures the video image in a predetermined sight of the area, and receiving a captured date and time when the camera captured the video image;
managing the video image in association with the captured date and time;
managing the video image in association with the operational information, the video image being associated with the captured date and time which matches with the obtained date and time;
extracting the video image and the operational information associated with a predetermined date and time; and
displaying the operational information associated with the obtained date and time, and displaying the video image associated with the captured date and time which matches with the obtained date and time.

* * * * *